March 23, 1954     T. O. COX ET AL     2,672,885
ROTATABLE QUICK OPENING VALVE
Filed Sept. 26, 1949
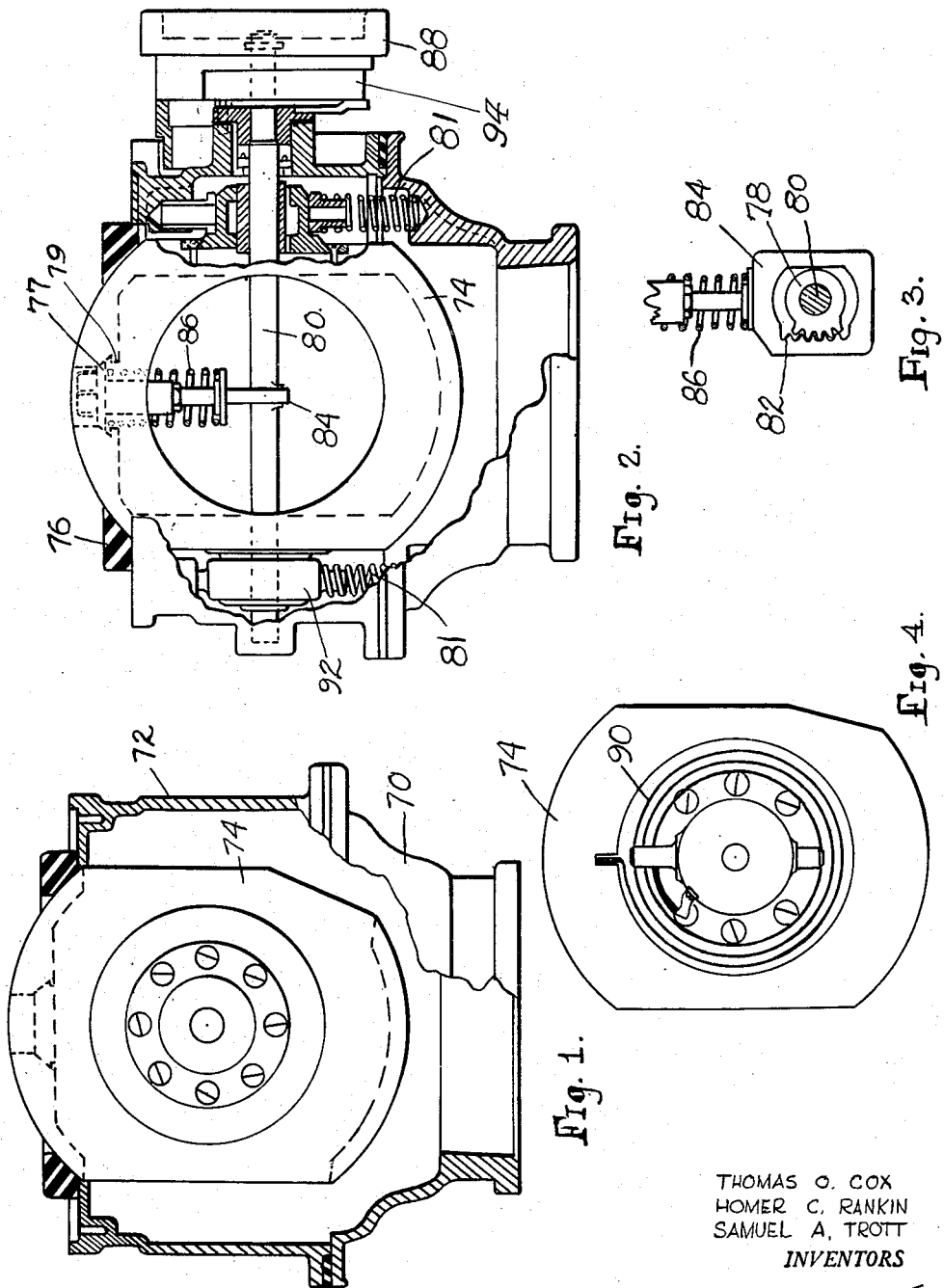
THOMAS O. COX
HOMER C. RANKIN
SAMUEL A. TROTT
*INVENTORS*
BY Albert J. Fihe
*ATTORNEY*

Patented Mar. 23, 1954

2,672,885

UNITED STATES PATENT OFFICE 2,672,885

ROTATABLE QUICK OPENING VALVE

Thomas O. Cox, Burbank, Homer C. Rankin, North Hollywood, and Samuel A. Trott, Long Beach, Calif., assignors, by mesne assignments, to Tracy S. Ansel, Wichita, Kans.

Application September 26, 1949, Serial No. 117,862

1 Claim. (Cl. 137—630.15)

This invention relates to a rotatable quick opening valve and has for one of its principal objects the provision of a valve for handling fluid materials in considerable quantities and under rather high pressure and which can be readily and conveniently opened and as readily closed.

The valve of this invention is particularly designed for use with the fueling nozzle and adapter developed by the same inventors upon which an application for patent was filed in the United States Patent Office on July 13, 1949, Serial No. 104,412, now abandoned.

Another important object of this invention is to provide a quick opening rotary valve which will, immediately upon opening, automatically move away from its seat so that further rotation will be accomplished freely and with no friction whatsoever against the seat. This insures easy manipulation and provides a longer life for both valve and seat.

Another and further important object of the invention is to provide a quick opening rotatable valve which will have an auxiliary relief valve incorporated into the structure whereby undue pressure on the valve and seat owing to heavy loads can be at least partially preliminarily lessened, thereby rendering both the opening and closing operations more easy and efficient.

A still further important object of the invention is the provision, in a rotatable quick opening valve, of a novel form of resilient valve seat which is so constructed that as the pressure on the valve and seat increases, the sealing action will be correspondingly built up.

Another object resides in the provision of such a valve whereby the auxiliary valve is incorporated into the main valve as distinguished from being a separate structure.

Yet another object is to provide means for automatically returning such a valve to closed position whenever the opening force is released.

Other and further important objects of the invention will be apparent from the disclosures in the accompanying drawings and following specification.

The invention, in a preferred form, is illustrated in the drawings and hereinafter more fully described.

In the drawings:

Figure 1 is a side elevation, parts being broken away, and other parts being shown in section, of the valve of this invention.

Figure 2 is a detail sectional view of the valve, illustrating more fully the interior construction and showing the valve in closed position.

Figure 3 is a detail view of that portion of the valve operating mechanism which first opens the poppet or pressure relief valve and then moves the main valve away from the resilient seat and to a position where it is then engaged and rotated to an open position.

Figure 4 is a detail view of the spring construction whereby the ball valve is automatically returned to a seating position from whence further rotation of the operating knob completes the closing movement.

As shown in the drawings:

The invention is illustrated in Figures 1 to 4, inclusive, where casings 70 and 72 enclose a rotatable valve 74, of the spherical type, and which cooperates with a valve seat 76. In this construction, the valve 74 is preliminarily moved away from its seat 76. However, before this is done, a relief valve 77 built into the valve 74 is preliminarily opened by means of a mutilated gear 78 mounted on a central operating shaft 80 and cooperating with an internal rack gear 82 forming part of a collar or harness 84, all as best shown in Figures 2 and 3.

The relief valve 77 is normally held in closed position by means of a helical spring 86 which surrounds its stem, and the shaft 80 is rotated by means of an operating knob or handle 88. Continued rotation of the knob or handle 88 pulls the valve 77 down into a position where it will contact an annular projection 79 of the main valve 74, as shown in Figure 2. This will then serve to pull the main valve 74 away from its seat 76 and against the tension of springs 81 which operate against the trunnions or bearings 92 in which the shaft 80 is positioned.

This form of valve is so constructed that it will automatically return to closed position upon the release of the manipulating knob or handle 88, this being accomplished by means of a pair of clock springs 90 mounted in opposed recesses in the valve 74, one end of each clock spring being fixed in the valve 74 and the other end being attached to the trunnion 92.

An additional spring is provided in a casing 94 which serves to return the shaft 80, the parts 78 and 84, and the valve 77 to normal closed position.

Here is provided a quick opening rotatable valve which includes a pressure relief element and which is so constructed that it will be slightly moved away from its seat before being rotated. The valve may also automatically be moved back to its seat and full sealing position for closing.

The valve will cooperate fully with the fueling nozzle and adapter shown and described in our prior application for patent Serial No. 104,412, either as a separate unit, individually manipulated or the two devices can be so connected that practically simultaneous operation is possible.

We are aware that many changes may be made and numerous details of construction varied throughout a wide range without departing from the principles of this invention, and we, therefore, do not purpose limiting the patent granted hereon otherwise than as necessitated by the prior art.

We claim as our invention:

In a quick opening rotatable valve having bearings, a casing, a resilient grooved seat in the casing, the valve element being rotatably mounted in the seat, means for preliminarily moving the valve from its seat before a turning movement thereof, said means including an off-center mounting of the valve supporting bearings, a shaft and gears, an auxiliary relief valve operated by the shaft and gears, said auxiliary valve mounted in the main valve, a handle on the shaft for opening both valves in succession, said handle serving to first open the auxiliary relief valve, then move the main valve away from its seat and finally rotate the main valve to full opening position, and means for automatically returning all valves to closed position upon release of the handle, said means including a clock spring associated with the handle, helical springs associated with the bearings for the main valve and a further spring associated with the auxiliary valve.

THOMAS O. COX.
HOMER C. RANKIN.
SAMUEL A. TROTT.

References Cited in the file of this patent

UNITED STATES PATENTS

| Number | Name | Date |
|---|---|---|
| 1,173,731 | Norbom | Feb. 29, 1916 |
| 1,311,815 | Harris | July 29, 1919 |
| 1,502,021 | De Francisco | July 22, 1924 |
| 2,058,748 | Wilkins | Oct. 27, 1936 |
| 2,064,765 | Powell | Dec. 15, 1936 |
| 2,095,136 | Jaussaud | Oct. 5, 1937 |
| 2,200,474 | Heggem | May 14, 1940 |
| 2,493,966 | Hartley | Jan. 10, 1950 |

FOREIGN PATENTS

| Number | Country | Date |
|---|---|---|
| 64,414 | Sweden | Dec. 18, 1925 |